The National Spring Company, Assees of Erastus T. Bussell.

4202 Combined India Rubber and Steel Springs.

REISSUED DEC 13 1870

Fig. 3

Compound Vulcanized rubber and Steel spring with the metallic cups on each end.

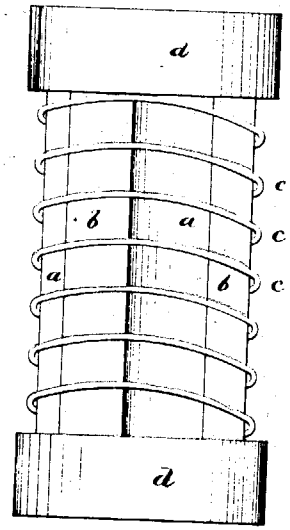

Fig. 1.

Fluted column of Vulcanized rubber with the metallic cups on each end.

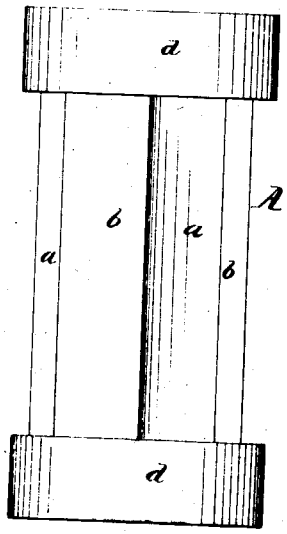

Fig. 2.

Transverse section of rubber column.

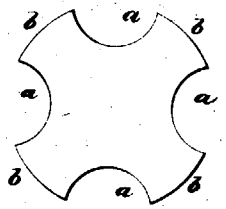

Witnesses
Wm Parsons Bell
W E Chaffee

Inventor
E. T. Bussell
By J. P. Kitch his atty

BEST AVAILABLE COPY

UNITED STATES PATENT OFFICE.

THE NATIONAL SPRING COMPANY, OF NEW YORK, N. Y., ASSIGNEE OF ERASTUS T. BUSSELL.

IMPROVEMENT IN COMBINED INDIA-RUBBER AND STEEL SPRINGS.

Specification forming part of Letters Patent No. 10,280, dated November 29, 1853; extended seven years; reissue No. 4,202, dated December 13, 1870.

*To all whom it may concern:*

Be it known that I, ERASTUS T. BUSSELL, of Shelbyville, in the county of Shelby, State of Indiana, invented a new and improved Combination of Vulcanized Rubber and Steel, forming thereby a spring useful for railroad cars, carriages, buggies, &c., of which the following is a specification:

Figure 1 represents a column of vulcanized rubber, showing, also, metal caps on each end, such as may be used for bearings. Fig. 2 is a cross-section of the same. Fig. 3 is a view of the column of rubber surrounded by a spiral metal spring, showing, also, the before-mentioned caps.

This invention consists in surrounding a column of india-rubber or its equivalent by a spiral metallic spring, so arranged that each sustains the other, whereby a more perfect and serviceable spring for the purposes specified is produced than by any combination of rubber and metal hitherto known.

A column of vulcanized rubber, A, is surrounded with a spiral metallic spring, *c c c*, Fig. 3, the two springs being of equal length, so as to have the same bearings at the ends, and the relative diameters of the two being such that the steel or metal spring will fit snugly onto the rubber column. The column of rubber may be fluted, as shown in the drawing, by several concavities running longitudinally, *a a a*. This construction is regarded as a desirable one, as it allows the rubber, when pressure is applied to the spring, to expand laterally into the said concavities, thus preventing it, in a degree, from being pressed outward between the coils of the metal spring, where it is liable to be chafed and worn. Any other material that is, for the purpose of a spring, the equivalent of india rubber, such as compressed animal or vegetable fiber, gutta percha, &c., may be employed in place of the rubber.

The combination of spiral metallic springs with rubber or its equivalent for the purpose here described is not new. Ray, in the year 1848, obtained a patent for such a combination. But he described and claimed a spiral metallic spring placed within a hollow rubber column or tube, and then supported the rubber externally by detached metal rings. The arrangement and combination of BUSSELL, here claimed, is distinct and different from and is thought superior to Ray's, both for the reason that it permits the use of a solid column of rubber or its equivalent, which Ray's does not, and because the spring, when placed exterior to the rubber or its equivalent, performs alone the combined offices of both the spiral spring and the detached rings in Ray's, thus rendering BUSSELL's arrangement much the more simple and cheaper of the two. Another objection to arranging the spiral with the rubber tube is that either the rubber tube has to be made objectionably large in diameter, or the spiral objectionably small. This difficulty is obviated in BUSSELL's combination, as is evident.

It is not intended here to claim, broadly, the combination of rubber or its equivalent with a spiral spring for the purposes indicated; nor the combination of a spiral spring with a hollow cylinder of rubber when the spring is placed within the cylinder. Neither is claimed the supporting of a column of rubber or its equivalent, when used as a spring by detached metallic rings arranged externally to the rubber; but

What is claimed, and desired to be secured by Letters Patent, is—

The combination of a column of rubber or its equivalent, whether solid or hollow, with a spiral metallic spring, when the said spring is arranged external to and surrounding the rubber, substantially as and for the purposes specified.

NATIONAL SPRING COMPANY,

By RICHD. VOSE, *Prest.*

Witnesses:

J. P. FITCH,

A. T. SANGSTON.